Aug. 8, 1939.  A. PERRETON  2,168,579
DEVICE FOR CUTTING AND PACKING COMB HONEY
Filed June 10, 1937   2 Sheets-Sheet 2
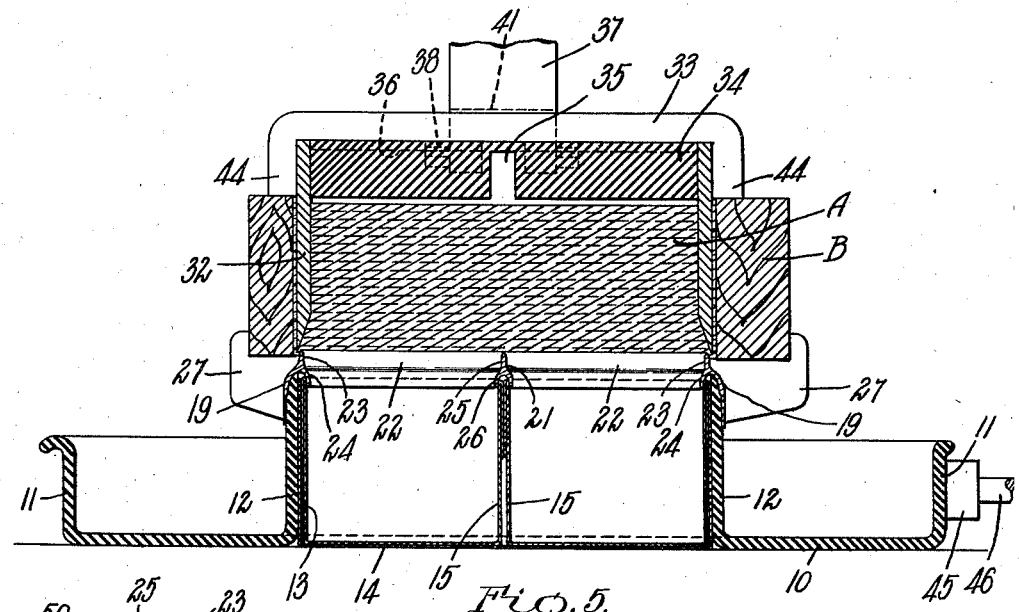
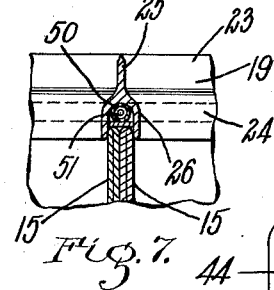
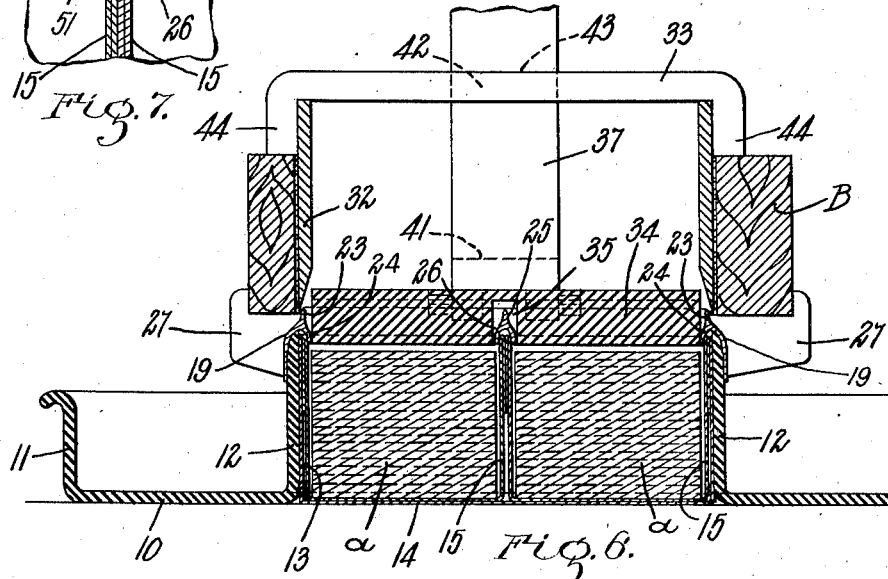
Inventor:
Arnold Perreton:
by Franklin E. Low,
Att'y.

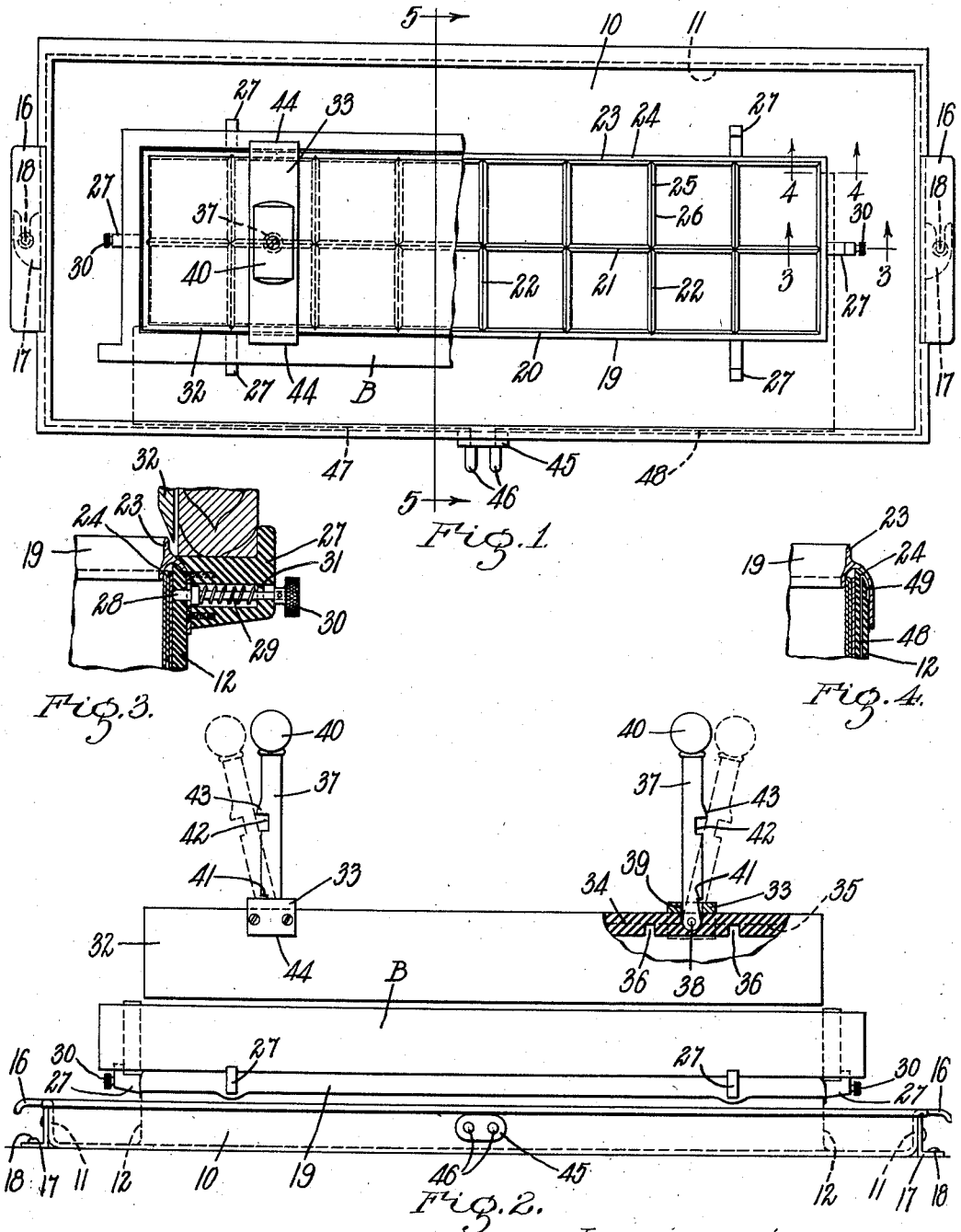

Patented Aug. 8, 1939

2,168,579

UNITED STATES PATENT OFFICE 2,168,579

DEVICE FOR CUTTING AND PACKING COMB HONEY

Arnold Perreton, Durham, N. H.

Application June 10, 1937, Serial No. 147,432

8 Claims. (Cl. 107—21)

This invention relates to a device for cutting and packing comb honey, particularly comb honey located in frames as received from the beehive.

The primary object of the invention is to provide a simple, inexpensive device for severing comb honey from its frame as received from the hive, and then simultaneously ejecting the severed mass of honey from said frame, cutting the honey into relatively small pieces and depositing said pieces into individual receptacles in order that they may be used eventually for individual servings.

Another object of the invention is to provide a device wherein the cutting instrumentalities for severing the large mass of comb honey into small pieces are heated in a manner to facilitate the cutting operation and at the same time to effectively force the edges of the cells of honey comb laterally in a manner to partly seal the severed cells, thereby preventing excessive dripping of the loose honey from said cells.

Still another object of the invention is to provide a structure wherein the knife utilized to cut the mass of comb honey from its frame may be easily and quickly connected to and disconnected from the means for ejecting the severed mass of comb honey from said frame; thereby enabling said knife and ejector to be operated in unison during the interval that the honey is being severed from the frame, and for the ejector to be actuated independently of the knife while the large mass of honey is being cut into small pieces.

The invention consists in a device for cutting and packing comb honey as set forth in the following specifications and particularly as pointed out in the claims.

Referring to the drawings:

Fig. 1 represents a plan view of a device for cutting and packing comb honey embodying my invention, certain portions thereof being broken away to expose other portions located therebeneath.

Fig. 2 is a side elevation of the device with a portion thereof broken away and illustrated in section, and with the ejector and knife utilized to sever the mass of comb honey from its frame illustrated in their raised positions.

Fig. 3 is an enlarged, detail sectional view taken on the line 3—3 of Fig. 1.

Fig. 4 is an enlarged, detail sectional view taken on the line 4—4 of Fig. 1.

Fig. 5 is an enlarged transverse section taken on the line 5—5 of Fig. 1 looking in the direction of the arrows on said line; the comb honey being illustrated within its frame although severed therefrom.

Fig. 6 is a sectional view similar to Fig. 5, but illustrating the comb honey cut into pieces and deposited into the receptacles.

Fig. 7 is an enlarged detail sectional view illustrating an alternate method of heating the cutting member utilized to cut large mass of honey into small pieces.

Like numerals refer to like parts throughout the several views of the drawings.

In the drawings, 10 represents a rectangular tray, preferably constructed of an electric insulating material as, for example, Bakelite. The tray 10 embodies therein an outer or peripheral flange 11 and an inner and relatively higher flange 12; the latter being formed to provide an enclosed bottomless area 13 adapted to receive an open container 14, as, for example, the bottom member of a paper or cardboard box in which a plurality of small receptacles 15 are positioned side by side. The small receptacles 15 are preferably constructed of waterproofed paper and may be of any desired construction. Handles 16 are provided for the tray 10 at the opposite ends thereof secured to the flange 11; but during the operation of the device it is preferably that said tray be firmly secured to a suitable work table. Detachable fastening means are therefore provided formed integral with the handles 16 and comprising slotted projecting portions 17 of said handles, said portions 17 being adapted to interlock with the head portions of screws 18 attached to the work table. The work table constitutes the supporting means for the container 14 and its enclosed receptacles 15 when said container is located within the area 13 of the tray.

Mounted upon the flange 12 of the tray 11 is a rectangular cutting member 19 embodying therein a peripheral portion 20, a central longitudinal portion 21 and a plurality of transverse portions 22, all of which are connected one to another to form a unitary structure which spans the open area 13 of the tray 10 and overlies and encloses the top edges of the flange 12, container 14 and receptacles 15. The peripheral portion 20 of the cutter member 19 embodies therein an upper knife portion 23 adapted to cut a material A, as, for example, comb honey, and other materials hereinafter to be mentioned, and a lower arched portion 24 into which the top edge portions of the flange 12, container 14 and receptacles 15 project. The central longitudinal portion 21 and transverse portions 22 of the cutter member 19 are similar in construction and embody therein an upper knife portion 25 adapted to cut the comb honey, and a lower arched portion 26 into which the top edge portions of the receptacles 15 project.

The comb honey A located within a frame B as received from the hive is supported above the cutting member 19 in a position to be discharged from said frame into cutting engagement with said cutting member, said frame resting upon and being positioned by a plurality of brackets 27 which are attached to the peripheral portion 20 of the cutting member at suitable locations upon the sides and ends thereof. The brackets 27 are preferably constructed of Bakelite and may be utilized as handles when lifting the cutting member 19.

During the operation of the device it is desirable that the cutting member 19 be firmly secured to the tray 10. The brackets 27 at the ends of the cutting member are, therefore, each provided with a locking pin 28 which is normally held by means of a spring 29 in a hole provided in the flange 12, see Fig. 3. The locking pins 28 are provided with pull knobs 30 and with laterally projecting pins 31, whereby said locking pins may be held disconnected from the flange 12 when pulled outwardly and rotated.

The mass of comb honey A is severed from its frame B by means of a rectangular knife 32 adapted to cut through said honey close to the inner surface of said frame. Cross bars 33 are provided for the knife 32 and are secured to the longitudinal blades thereof. Located within the knife 32 and adapted to be raised and lowered therein between the side and end blades thereof is a rectangular ejector 34 preferably constructed of Bakelite. The under surface of the ejector 34 is grooved longitudinally thereof at 35, and transversely thereof at 36, 36 to receive the longitudinal and transverse portions 21 and 22 respectively of the cutter member 19 when said ejector is located in its lowered position as illustrated in Fig. 6. Arms 37 are pivotally attached to the ejector at 38 at points beneath the cross bars 33 of the knife 32, and said arms 37 project upwardly from said ejector and through openings 39 provided therefor in said cross bars. Handles 40 are secured to the arms 37 at the upper extremities thereof. The arms 37 are notched at 41 in order that they may be interlocked with the cross bars 33 of the knife 32 during the operation of said knife to sever the comb honey A from its frame B, at which time the arms 37 are tipped as indicated in dotted lines in Fig. 2 to cause the notches 41 to engage said cross-bars. Under these conditions with the arms 37 held in a tipped position, the knife 32 may be forced downwardly through the comb honey A to sever the same from its frame B and the ejector 34 will in effect be interlocked with the knife 32 and will move downwardly in unison therewith. The arms 37 are each provided with a notch 42 at an intermediate point thereon, and with a stop 43 located adjacent to said notch. After the mass of comb honey has been severed from its frame B by the knife 32, during the downward movement of the ejector 34 to force the mass of honey from the frame and knife and through the cutting member 19, the stops 43 will engage the cross bars 33 and thereby limit the downward movement of the ejector to the position illustrated in Fig. 6. The lower extremities of downwardly projecting portions 44 of the cross bars 33 also constitute stops to limit the downward movement of the knife 32 as it passes through the mass of honey A in the frame B.

During the operation of the device to cut the mass of comb honey A into a plurality of small pieces a it is desirable that heat shall be applied to the cutting member 19. This may be accomplished by passing an electric current through the cutting member 19 as follows: Mounted upon the outer side of the flange 11 of the tray 10 is a terminal box 45 from which terminal pins 46 project. The terminal pins 46 are connected by wires 47 and 48, which are preferably embedded in the insulating material of the tray, to diagonally opposite corner portions of said tray, where they are connected to terminal members 49 which are secured to the flange 12 in a manner to contact with the cutter member 19 and make electric contact therewith as illustrated in Fig. 4. The temperature of the cutting member 19 may be regulated as may be desired by means of a suitable rheostat interposed in the electric circuit connections to the terminal 46.

The general operation of the device hereinbefore specifically described is as follows: A tray 10 secured to a work table beneath the heads of the screws 18 has an open container 14 positioned in the central area 13 thereof formed by the flange 12. Within the container 14 a plurality of small open receptacles 15 are positioned side by side. The cutting member 19 is then placed upon the flange 12 with the peripheral portion of said cutting member overlying and enclosing the top edge of the container 14 and top edges of the outer sides of the receptacles 15; and with the longitudinal and transverse portions 21 and 22 overlying and enclosing the top edges of abutting sides of said receptacles 15. When the cutting member 19 is seated upon the flange 12 it is held locked thereto by the locking pins 28 and said cutting member contacts with electric terminal members located at diagonally opposite corners of said flange 12.

A frame B containing a mass of comb honey A as received from the hive is then placed upon the brackets 27 by which it is correctly positioned above the cutting member 19. The knife 32 with the ejector 34 positioned therein is then placed in cutting position upon the mass of comb honey A and the handles 40 of the arms 37 are grasped and forced apart as indicated in dotted lines in Fig. 2, to cause the notches 41 of said arms to overlie the cross bars 33 of said knife and thereby hold the ejector in its elevated position within said knife. The knife 32 is then forced downwardly through the comb honey until the stop portions 44 of the cross bars 33 contact with the frame B as illustrated in Fig. 5, at which time the honey is severed from its frame B. The arms 37 are then moved into a vertical position to disconnect the knife 32 from the ejector, and the latter is then forced downwardly to push the mass of honey A through the heated cutting member 19, thereby causing the knife portions 23 and 25 thereof to cut through said honey and sever the mass into a plurality of small pieces a which are deposited into the small receptacle 15 as illustrated in Fig. 6.

During the passage of the honey through the cutting member 19 the partly severed pieces of honey are compressed by the arched portions 24 and 26 of the cutting member and the edge portions of the severed cells are turned or bent laterally in a manner to partly seal said cells. At the end of the downward movement of the ejector 34 which is terminated by the engagement of the stops 43 with the cross-bars 33, the arms 37 are again tipped outwardly to engage the notches 42 with said cross bars and the ejector in its lowered position and knife 32 with the honey comb frame B clinging thereto are all raised in unison from the cutting member 19 which remains locked to the tray 10. After the frame B has been removed from the knife 32, the knife and ejector 34 are placed in hot water and freed of the loose honey that may be sticking thereto. If it is desired to wash the cutting member 19 after each cutting operation, said cutting member may be raised in unison with the knife 32, ejector 34, and honey comb frame 19 by disconnecting the locking pins 28 from the flange 12, and the loose honey upon the cutting member will cause the latter to stick to the ejector and be lifted in unison therewith. The cutting member 19 may be removed from the tray 10 and washed after each cutting operation, or as often as may be necessary or desirable as determined by the character of the material operated upon. The container 14 and its enclosed receptacles filled with honey are removed from the area 13 within the tray 10 by sliding said tray from beneath the heads of the screws 18 and then lifting the tray off the container.

During the operation of the device, loose honey that may drain from the portions of the severed cells which remain attached to the honey comb frame B is collected in the tray 10.

In Fig. 7 I have illustrated a modified means for supplying heat to the cutting member 19, wherein an electric heating element 50, well known in the art, is covered with insulating material 51 and enclosed within each of the arched portions of said cutting member, the opposite end portions of said heating element being connected to the electric terminals 49 to complete the electric circuit through the cutting member.

Although I have illustrated and described two methods of heating the cutting member 19 by means of electricity, it is evident that said member may be heated satisfactorily by means of the hot water utilized to free the cutting member of loose honey, the cutting member being taken from said hot water and placed immediately upon the tray, and the cutting operation taking place while the cutting member is still hot.

Although the device of this invention has been designed for the express purpose of severing comb honey from its frame and then cutting said honey into pieces and depositing the latter into individual receptacles, it is evident that the device may be utilized satisfactorily as a means for cutting and packing many food products of a plastic sticky nature as, for example, butter, cheese, ice cream, etc., whether said materials are located within a frame or not.

I claim:

1. A device of the character described comprising, in combination, means to position a plurality of receptacles side by side, a cutting member mounted upon said positioning means and overlying and enclosing the top edges of said receptacles, means upon said cutting member to support a frame containing a mass of material above the cutting member, and means to force said mass of material out of said frame and through said cutting member, whereby the material is cut into pieces and deposited into the receptacles during the cutting operation.

2. A device of the character described comprising, in combination, means to position a plurality of receptacles side by side, a cutting member mounted upon said positioning means and overlying and enclosing the top edges of said receptacles, means to apply an electric current to said cutting member to heat the latter, means upon said cutting member to support a frame containing a mass of material above the cutting member, and means to force said mass of material out of said frame and through the cutting member, whereby the material is simultaneously cut into pieces and deposited into the receptacles.

3. A device for cutting and packing comb honey comprising, in combination, means to position a plurality of receptacles side by side, a cutting member mounted upon said positioning means and overlying and enclosing the top edges of said receptacles, means to support a frame containing a mass of comb honey above said cutting member, means to cut the mass of comb honey from its frame, and means to force said mass of honey through said cutting member, whereby the honey is cut into pieces and deposited into said receptacles.

4. A device of the character described comprising, in combination, a support embodying therein a flange forming an enclosed area in which a plurality of receptacle are positioned side by side, a cutting member mounted upon said flange and overlying and enclosing the top edges of said receptacles, means to support a frame containing a mass of material above said cutting member, and an ejector to force said material out of its frame and through the cutting member, whereby the material is cut into pieces and deposited into the receptacles.

5. A device of the character described comprising, in combination, a support embodying therein a flange forming an enclosed area in which a plurality of receptacles are positioned side by side, a cutting member mounted upon said flange and overlying and enclosing the top edges of said receptacles, a spring actuated pin to lock the cutting member to the support, means to support a frame containing a mass of material above the cutting member, and an ejector to force said material out of its frame and through the cutting member, whereby the material is cut into pieces and deposited into the receptacles.

6. A device for cutting and packing comb honey comprising, in combination, a tray embodying therein a flange surrounding an opening and forming an enclosed bottomless area in which a plurality of receptacles are positioned side by side, a cutting member mounted upon said flange and overlying and enclosing the top edges of said receptacles, means to support a frame containing a mass of comb honey above said cutting member, and means to force said mass of comb honey out of its frame and through the cutting member, whereby the honey is cut into pieces and deposited into the receptacles.

7. A device for cutting and packing comb honey comprising, in combination, a tray embodying therein a flange surrounding an opening and forming an enclosed bottomless area in which a plurality of receptacles are positioned side by side, a cutting member positioned upon said flange and overlying and enclosing the top edges of said receptacles, means to apply an electric current to said cutting member to heat the latter, means to support a frame containing a mass of comb honey above the cutting member, means to sever said mass of comb honey from its frame, and means to force the mass of honey out of the frame and through the cutting member, whereby the honey is cut into pieces and deposited into the receptacles.

8. A device for cutting and packing comb honey comprising, in combination, a tray embodying therein a flange surrounding an opening and forming an enclosed area in which a plurality of receptacles are positioned side by side, a cutting member mounted upon said flange and embodying therein intersecting cutting blades having arched portions located therebeneath adapted to overlie and enclose the top edges of said receptacles, spring actuated means to lock said cutting member to said tray, electric means to heat the cutting member, means to support a frame containing a mass of comb honey above the cutting member, means to sever the mass of honey from its frame, and means to force the mass of honey out of the frame and through the cutting member, whereby the honey is cut into pieces, compressed and deposited into the receptacles.

ARNOLD PERRETON.